(12) United States Patent
Fuchs

(10) Patent No.: US 6,538,071 B1
(45) Date of Patent: Mar. 25, 2003

(54) RUBBER MIXTURES FOR ROLLER COATINGS

(75) Inventor: Erich Fuchs, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 46 days.

(21) Appl. No.: 09/653,972

(22) Filed: Sep. 1, 2000

(30) Foreign Application Priority Data

Sep. 7, 1999 (DE) .......................................... 199 42 743

(51) Int. Cl.⁷ .............................................. C08F 275/00
(52) U.S. Cl. ........................ 525/274; 523/202; 523/205; 523/206; 523/207; 523/210; 523/215; 523/216
(58) Field of Search .......................... 525/274; 523/202, 523/205, 208, 207, 209, 210, 215, 216

(56) References Cited

U.S. PATENT DOCUMENTS

| 3,700,637 A | 10/1972 | Finch ........................ 260/83.3 |
| 4,337,329 A | 6/1982 | Kubo et al. ................. 525/339 |
| 4,384,081 A | 5/1983 | Kubo et al. ................. 525/339 |
| 4,452,951 A | 6/1984 | Kubo et al. ................. 525/339 |
| 4,503,196 A | 3/1985 | Rempel et al. ............. 525/338 |
| 4,581,417 A | 4/1986 | Buding et al. ............... 525/338 |
| 4,826,910 A | * 5/1989 | Schwarz ...................... 524/521 |
| 4,857,571 A | * 8/1989 | Reiter ........................ 524/248 |
| 4,983,678 A | 1/1991 | Saito et al. .................. 525/193 |
| 5,208,294 A | 5/1993 | Brown ........................ 525/263 |
| 5,391,627 A | 2/1995 | Araki et al. ................. 525/274 |
| 5,501,643 A | * 3/1996 | Isshiki ........................ 474/268 |
| 5,506,308 A | 4/1996 | Ahmad et al. ............... 525/256 |
| 5,552,460 A | 9/1996 | Schmidt et al. ............. 523/522 |
| 5,584,771 A | 12/1996 | Isshiki et al. ............... 474/264 |

FOREIGN PATENT DOCUMENTS

| EP | 864607 | 9/1998 |
| GB | 1558491 | 8/1976 |

OTHER PUBLICATIONS

Handbuch für die Gummiindustrie, Bayer AG, (month unavailable), 1992, Leverkusen, p. 535, D12.2 Vulkasil.

* cited by examiner

*Primary Examiner*—Edward J. Cain
(74) *Attorney, Agent, or Firm*—Joseph C. Gil; Jennifer R. Seng; Noland J. Cheung

(57) ABSTRACT

This invention relates to a rubber mixture containing a nitrile rubber, a metal salt of an acrylate, a liquid acrylate and optionally other additives, a process for its preparation, and use for all types of molded articles, in particular roller coatings.

5 Claims, No Drawings

RUBBER MIXTURES FOR ROLLER COATINGS

FIELD OF THE INVENTION

This invention relates to a rubber mixture containing a nitrile rubber, a metal salt of an acrylate, a liquid acrylate and optionally other additives, a process for its preparation, and use for all types of molded articles, in particular roller coatings.

BACKGROUND OF THE INVENTION

Rollers having a rubber coating are used in many fields, including the print and textile industry, in machines, such as, for example, fax machines and in the steel industry and paper industry.

Roller coatings are subjected to extreme stresses, particularly in the steel and paper industries. In such applications, the coatings are required to have a combination of the following properties:

low compression set;

low abrasion;

little swelling in the media used;

good resistance to heat and chemicals;

excellent adhesion to the metal surface under the coating; and/or low build-up of heat under stress.

SUMMARY OF THE INVENTION

It has now been found that a rubber mixture which contains a nitrile rubber and, in addition, a metal salt of an acrylate and a liquid acrylate is particularly suitable as raw material for rubber coatings for rollers.

This application accordingly provides a rubber mixture, containing a) one or more nitrile rubbers b) one or more metal salts of an acrylate c) one or more liquid acrylates, optionally applied to a carrier, and d) optionally other additives and/or fillers.

Nitrile rubbers are meant to be diene-(meth)acrylonitrile copolymers. The preferred dienes here are isoprene and, in particular, butadiene. The copolymers have a content of copolymerized acrylonitrile units and/or methacrylonitrile units of 5 to 60 wt. %, preferably 10 to 50 wt. %.

Moreover, the term explicitly includes hydrogenated nitrile rubbers. According to this invention, "hydrogenated nitrile rubber" or "HNBR" means nitrile rubbers, the C=C double bonds of which are selectively (that is, without hydrogenation of the C≡N triple bond) partially or completely hydrogenated. Preferred hydrogenated nitrile rubbers are those having a degree of hydrogenation, based on the C=C double bonds originating from the butadiene, of at least 75%, preferably of at least 95%, in particular of at least 98%. The degree of hydrogenation can be determined by NMR spectroscopy and IR spectroscopy.

The hydrogenation of nitrile rubber is known: U.S. Pat. No. 3,700,637, DE-A 2,539,132, DE-A 3,046,008, DE-A 3,046,251, DE-A 3,227,650, DE-A 3,329,974, EP-A 111, 412, FR-B 2,540,503. Hydrogenated nitrile rubbers are distinguished by having high tensile strength, low abrasion, low residual deformation after compressive stress and tensile load and good resistance to oil, but primarily by a notable resistance to thermal and oxidative influences. Accordingly, hydrogenated nitrile rubbers are preferred in this invention.

Suitable nitrile rubbers generally have Mooney viscosities (DIN 53 523, ML 1+4) of 25 to 100 Mooney units, in particular 40 to 80 Mooney units.

The addition of metal salts of an acrylate to mixtures containing nitrile rubbers is known. Suitable acrylates may be unsubstituted or substituted. Methacrylates are an example of substituted acrylates.

The person skilled in the art knows of suitable acrylates from EP-A1 0,319,320, in particular page 3, lines 16 to 35; from U.S. Pat. No. 5,208,294, in particular column 2, lines 25 to 40 and from U.S. Pat. No. 4,983,678, in particular column 2, lines 45 to 62. Zinc acrylate, zinc diacrylate and zinc dimethylacrylate, in particular, are mentioned there.

It may be advantageous to use the metal salt of the acrylate together with a scorch retarder. Suitable examples here are hindered phenols, such as methyl-substituted aminoalkylophenols, in particular 2,6-ditert.-butyl-4-(dimethylamino)phenol.

The liquid acrylate may be any acrylate which is known to the person skilled in the art and is in liquid form at room temperature.

Trimethylolpropane trimethacrylate (TRIM), butanediol dimethacrylate (BDMA) and ethylene glycol dimethacrylate (EDMA) are particularly preferred.

In order to achieve an improved incorporation, it may be advantageous to use the liquid acrylate bound to a carrier. Examples of suitable carriers are silicates, precipitated silicas, clays, carbon black, talc or polymers. In general, mixtures containing 5 to 50 wt. % carrier are used.

Other suitable additives include those known to the person skilled in the art, for example, vulcanization activators, in particular metal oxides, such as zinc oxide or magnesium oxide, antidegradants, such as alkyl-substituted diphenylamines, mercaptobenzimidazoles, unsaturated ethers, such as Vulkazon® AFD (Bayer AG, D) or cyclic, unsaturated acetals, such as Vulkazon® AFS/LG (Bayer AG, D). The following may also be mentioned as additives:

plasticizers, in particular carboxylic esters, as well as sebacic acid and its derivatives or trimellitic acid and its derivatives processing aids, in particular stearic acid and its derivatives, such as zinc stearate, or polymers, such as poly(ethylene vinyl acetate) (Levapren® from Bayer AG, D) or poly(ethylene vinyl acrylate)VAMAC® from DuPont).

It may also be advantageous to introduce fillers into the rubber mixture according to the present invention. These may be non-reinforcing or reinforcing.

Examples of fillers which may be mentioned are:

carbon blacks, such as MT, GPF, SRF blacks and primarily FEF blacks;

metal oxides, such as titanium dioxide (primarily as white pigment);

silicates, such as sodium aluminium silicate;

silicas, in particular precipitated silicas;

To improve the abrasion, so-called active fillers in accordance with the DIN 66131 are preferred, published, for example, on page 535 of "Handbuch für die Gummiindustrie", Bayer AG, 1992, Leverkusen.

Clays, mica, talc.

In addition, it may be advantageous to use extra activators in order to improve the adhesion between filler and rubber, such as, for example, silanes, such as Silquest® RC-1 (Union Carbide, US). Pigments may also be added.

The quantities of the individual components of the mixture depend on the intended use of the mixture and can be determined by a few preliminary tests.

The materials are generally used in the following quantities (in each case, in phr=per hundred parts of rubber):

metal salt of an acrylate: 10 to 120 phr, preferably 10 to 85 phr, most preferably, 20 to 65 phr, liquid acrylate: 5 to 80 phr, preferably 20 to 60 phr, in each case calculated without carrier, antidegradant: 0 to 4 phr, retarder: 0 to 2 phr, metal oxides, such as ZnO: 0 to 30 phr, fillers: 0 to 150 phr, preferably active fillers, plasticizer: 0 to 20 phr, processing aids: 0 to 2 phr.

The invention also provides crosslinkable mixtures containing the rubber mixtures according to the present invention, as well as a process for the preparation of the rubber mixtures according to the present invention and of cross-linkable rubber mixtures, characterized in that the components are mixed in a mixing unit.

In order to produce crosslinkable mixtures from the mixtures according to the present invention, crosslinking agents are added to the rubber mixtures according to the present invention. Peroxide systems are suitable crosslinking agents.

Preferred peroxide systems include dialkyl peroxides, ketal peroxides, aralkyl peroxides, peroxide ethers, peroxide esters, such as, for example: di-tert.-butyl peroxide, bis(tert.-butylperoxyisopropyl)benzene, dicumyl peroxide, 2,5-dimethyl-2,5-di(tert.-butylperoxy)hexane, 2,5-dimethyl-2,5-di(tert.-butylperoxy)-3-hexene, 1,1-bis(tert.-butylperoxy)-3,3,5-trimethylcyclohexane, benzoyl peroxide, tert.-butyl cumyl peroxide and tert.-butyl perbenzoate.

The quantities of peroxide are within the range of 1 to 10 phr, preferably within the range of 4 to 8 phr, based on rubber. The cross-linking can be effected at temperatures of 100° C. to 200° C., preferably 130° C. to 180° C., optionally at a pressure of 10 to 200 bar. Subsequent to the crosslinking, the vulcanizates can be post-cured by being stored at elevated temperature.

The peroxides can advantageously also be used in polymer-bound form. Appropriate systems are commercially available, for example, Poly-Dispersion® T (VC) D-40 P from Rhein Chemie Rheinau GmbH, D (=polymer-bound di-tert.-butylperoxyiso-propylbenzene).

The crosslinking can also be achieved by high-energy radiation.

Crosslinking according to the present invention means that less than 10 wt. %, preferably less than 5 wt. %, based on rubber, is extractable during extraction for 10 hours in a Soxhlet attachment with toluene as extracting agent.

The optimal quantity of crosslinking agent is easily determined by preliminary experiments.

Any apparatus for mixing rubbers which is known to the person skilled in the art may be used as the mixing apparatus, in particular internal mixer, open mills and screw-type machines.

Here, care should be taken to ensure that the rubber is not degraded during the mixing procedure. It may be advantageous to cool the mixture during the mixing procedure. In order to avoid scorch, the peroxide is frequently added as the last component, optionally in a separate mixing procedure.

The invention also provides the use of the rubber mixtures according to the present invention for the production of all types of molded articles, in particular coatings for rollers, most particularly rollers for the paper, textiles, printing and steel industries. Rollers generally consist of a metal core having a variable diameter, metal cores with a diameter of 1 to 5 m being preferred. The metal core generally consists of steel of various compositions, onto which the crosslinkable rubber mixture is drawn by means of conventional prior art methods and subsequently cross-linked. A good adhesion of coating to metal and inside the coating is crucial here. It may be advantageous to improve the adhesion of coating to metal by means of adhesion promoters, such as dispersions/solutions of halogenated polymers, optionally with crosslinking agents/fillers/pigments. These substances are commercially available.

The rubber mixtures according to the present invention are particularly suitable for use on rollers, as in the crosslinked condition they combine an excellent hardness in the range above 20 Shore D (DIN 53 505), even at elevated service temperatures, with a good resistance to abrasion, heat, water and chemicals. This balanced range of properties is not achieved in prior art. The rubber mixtures according to the present invention are, of course, also suitable for the production of other molded articles, such as profiles, belts, rings, seals, damping elements, etc.

Accordingly, molded articles, in particular rollers and belts, obtainable using a rubber mixture according to the present invention are also provided by the invention.

To the person skilled in the art, it is a trivial matter to modify specifically the proper-ties of the mixtures according to the present invention by adding other polymers, such as BR, NR, IIR, IR, EPDM, EPM, CR, SBR, AEM, ACM or fluoropolymers.

The following Examples are intended to illustrate the invention, without thereby limiting it.

EXAMPLES

| A. Methods of measurement | |
|---|---|
| Residual double-bond content | IR spectroscopy |
| Mooney viscosity (ML 1 + 4 (100° C.)) | ASTM D 1646 (given in Mooney units) |
| Volatile constituents (wt. %) | ASTM D 1416 |
| Ash content (wt. %) | ASTM D 1416 |
| Acrylonitrile (ACN) content (wt. % bound in the polymer) | in accordance with the instructions below. |

B. Brief Description of the Method

In the analysis, the rubber is pyrolyzed at 900° C. on a catalyst in a stream of oxygen. The unused oxygen is absorbed on a copper reduction reactor and the $NO_x$ gases formed are reduced to nitrogen. Then the $CO_2$ present in the stream of sample gas is withdrawn in an $Na_2CO_3$/NaOH trap and the water present in the stream of sample gas is withdrawn in an $MgClO_4$ trap. The change in the thermal conductivity of the stream of sample gas compared with the stream of carrier gas is a measure of the nitrogen content of the sample.

C. Equipment

Protein analyzer, product of Fisons, Model NA 2000

Microbalance, product of Sartorius, Model Micro

Analytical unit, product of Digital, Model DECpc Lpx 433 dx, with interfaces to the NA 2000 and balance interface, and the software EAGER 200

D. Chemicals and Solvents

Methionine, product of Hekatech

E. Constituents of formulation

| | | |
|---|---|---|
| Therban ® C 3467 | Bayer AG | HNBR with 5.5% RDB 34% ACN, 68 Mooney units |
| Zinkoxyd Aktiv | Bayer AG | active zinc oxide |
| Scorchguard ® O | Rhein Chemie Rheinau GmbH | magnesium oxide paste |
| Naugard 445 | Uniroyal | subst. diphenylamine |
| Vulkanox ® ZMB 2 | Bayer AG | zinc methylmercapto-benzimidazole |
| Tronox ® R-UF | Kerr-McGee Pigments GmbH & Co. KG | titanium dioxide, rutile type |
| Vulkasil ® S | Bayer AG | precipitate silica |
| Vulkasil ® A 1 | Bayer AG | sodium aluminum silicate |
| Sartomer SR633 | Sartomer | zinc diacrylate with retarder additive |
| TRIM SR-350 | Sartomer | trimethylolpropane trimethacrylate |
| Rhenofit ® TRIM/S | Rhein Chemie Rheinau GmbH | trimethylolpropane trimethacrylate 70% bonded to silica 30% |
| BDMA ATM | Ancomer | butanediol dimethacrylate |
| Ethanox 703 | Albemarle, BE | 2,6-di(tert.-butyl-4-(di-methylamino)phenol |
| Poly-Dispersion ® T (VC) D-40 P | Rhein Chemie Rheinau GmbH | di(tert.-butylperoxy-iso-propyl)benzene, polymerically bonded |

F. Preparation of the Mixtures

The mixtures were prepared in an internal mixer GK 1.5 E (product of Krupp Elastomertechnik, Hamburg). Cooling-water temperature 50° C.; rotor speed 50 rpm; ram pressure 6 bar; proportion of internal mixer filled 70–80%, based on the volume of the mixing compartment.

Mixing procedure: The rubber is placed in the internal mixer. After an operating time of 1 minute, the remaining constituents are added. The internal mixer emptied at a batch temperature of >125° C. The peroxide is subsequently mixed on a roll mill (Krupp Elastomertechnik; diameter 200 mm, working width 350 mm) at a cooling-water temperature of 40° C.

The sheets for the determination of the mechanical properties were cross-linked/vulcanized under the stated conditions, between Teflon sheets, in a vulcanizing press (Krupp Elastomertechnik).

| Value: | Dimension | Properties: | Test Standard: |
|---|---|---|---|
| ML-1 + 4/100° C. | Mooney units | Mooney viscosity | DIN 53525 Part 3 |
| MS-T5/120°, and 140° C. | min | Mooney pre-vulcanization behavior (time for 5 Mooney units above minimum) | DIN 53525 Part 4 |
| MDR rheometer minimum, or maximum or MAX-Min | S'd Nm | Course of vulcanization. Torque-minimum-maximum or difference max./min. | DIN 53529 Part 3 |
| T10, T50, T80, T90 | min | Time for 10%, 50%, 80%, 90% of full cure | |
| F | MPa | Tensile strength | DIN 53504 |
| D | % | elongation at break | DIN 53504 |
| S xxx | MPa | Tensile strength at xxx % elongation | DIN 53504 |
| H | Shore A/D | Hardness | DIN 53505 |
| E | % | Rebound resilience | DIN 53512 |
| Abrasion | cmm | Abrasion | DIN 53516 |
| Compression set | % | Compression set | DIN 53517 Sample II |
| Hot-air aging delta F, delta D, delta H | %, or Shore A/D | Aging in hot air Change in tensile strength, elongation at break, hardness | DIN 53508 |
| Distilled water | | Immersion in distilled water | |
| delta F, delta D, delta H, delta G | %, or Shore D | Change in tensile, strength, elongation at break, hardness weight | DIN 53521 |

G. Testing of the mixtures

Example 1

| | Parts |
|---|---|
| Therban C 3467 | 100 |
| Sartomer SR 633 | 60 |
| Rhenofit TRIM/S | 57 |
| Naugard 445 | 2 |
| Poly-Dispersion T (VC) D-40 P | 6 |
| Ethanox 703 | 1 |

Properties of the mixtures

| | | |
|---|---|---|
| ML-1 + 4/100° C. | (Mooney units) | 24 |
| MS-T5/ 120° C. | (min) | 120/140° C. >45/>45 |

MDR Rheometer 170° C./ operating time 45 min

| | | |
|---|---|---|
| MINIMUM | (S'dNm) | 0.3 |
| MAXIMUM | | 160.4 |
| MAX-MIN | | 160.1 |
| T 10 | (min) | 3.5 |
| T 50 | | 6.8 |
| T 80 | | 11.6 |
| T 90 | | 15.2 |
| Vulcanization 170° C. (min) | | 17 |

| | | |
|---|---|---|
| F | (MPa) | 20.3 |
| D | (%) | 110 |
| S 20 | (MPa) | 12.8 |
| S 50 | (MPa) | 15.9 |
| S 100 | (MPa) | 20.5 |
| H 23° C. | (Sh. A) | 97 |
| H 23° C. | (Sh. D) | 55 |
| Vulcanization 170° C. (min) | | 23 |

| | |
|---|---|
| Abrasion DIN 53516 (cmm) | 63 |

Example 2

| | |
|---|---|
| Therban C 3467 | 100 |
| Zinkoxyd aktiv | 2 |
| Scorchguard O | 2 |
| Vulkasil S | 20 |
| Vinylsilane (1) | 3 |
| Naugard 445 | 2 |
| Vulkanox ZMB-2 | 0.5 |
| Tronox R-UF | 3 |
| Rhenofit TRIM/S | 57 |
| Sartomer SR 633 (3) | 60 |
| Ethanox 703 | 1 |
| Poly-Dispersion T (VC) D-40 P | 6 |

-continued

G. Testing of the mixtures
Properties of the mixture

| | | |
|---|---|---|
| ML-1 + 4/100 C | (Mooney units) | 37 |
| MS-T5/135 C | (min) | 43.2 |

MDR Rheometer 152° C./operating time 180 min.

| | | |
|---|---|---|
| MINIMUM | (S'dNm) | 0.9 |
| MAXIMUM | | 195.7 |
| MAX–MIN | | 194.9 |
| T 10 | (min) | 8.7 |
| T 50 | | 11.4 |
| T 80 | | 14.4 |
| T 90 | | 16.2 |

Vulcanization 90 min 152° C.

| | | |
|---|---|---|
| F | (MPa) | 20.8 |
| D | (%) | 46 |
| S 20 | (MPa) | 17.3 |
| S 50 | (MPa) | 21.3 |
| S 100 | (MPa) | — |
| H 23° C. | (Sh. A) | 99 |
| H 23° C. | (Sh. D) | 69 |

Hot-air aging 21 d 100° C.

| | | |
|---|---|---|
| ΔF | (%) | +22 |
| ΔD | (%) | −20 |
| ΔH | (Sh. D) | +3 |

Distilled water 90° C.

| | | | |
|---|---|---|---|
| ΔF | (%) | 7 d | +1 |
| | | 14 d | +1 |
| ΔD | (%) | 7 d | +22 |
| | | 14 d | +17 |
| ΔH | (Sh. A) | 7 d | −1 |
| | | 14 d | −1 |
| ΔH | (Sh. D) | 7 d | −7 |
| | | 14 d | −9 |
| ΔG | (%) | 7 d | +2.5 |
| | | 14 d | +1.7 |

Vulcanization 180 min. 152° C.

| | | |
|---|---|---|
| Abrasion DIN 53516 | (cmm) | 129 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rubber mixture consisting of:
   a) at least one nitrile rubber;
   b) at least one metal salt of an acrylate;
   c) at least one liquid acrylate, applied to a support, and
   d) an additive and/or a filler,
   wherein the metal salt of acrylate is present in an amount of about 20 to 120 phr, and
   wherein the liquid acrylate is present in an amount of about 10 to about 80 phr.

2. A cross-linkable rubber mixture comprising a rubber mixture, wherein said rubber mixture consists of:
   a) at least one nitrile rubber;
   b) at least one metal salt of an acrylate;
   c) at least one liquid acrylate, applied to a support, and
   d) an additive and/or a filler,
   wherein the metal salt of acrylate is present in an amount of about 20 to 120 phr, and
   wherein the liquid acrylate is present in an amount of about 10 to about 80 phr.

3. A process for the preparation of a rubber mixture consisting of the step of mixing in a mixing unit:
   a) at least one nitrile rubber;
   b) at least one metal salt of an acrylate;
   c) at least one liquid acrylate, applied to a support, and
   d) an additive and/or a filler,
   wherein the metal salt of acrylate is present in an amount of about 20 to 120 phr, and
   wherein the liquid acrylate is present in an amount of about 10 to about 80 phr.

4. A molded article comprising a rubber mixture consisting of:
   a) at least one nitrile rubber;
   b) at least one metal salt of an acrylate;
   c) at least one liquid acrylate, applied to a support, and
   d) an additive and/or a filler,
   wherein the metal salt of acrylate is present in an amount of about 20 to 120 phr, and
   wherein the liquid acrylate is present in an amount of about 10 to about 80 phr.

5. A coating for a roller comprising a rubber mixture consisting of:
   a) at least one nitrile rubber;
   b) at least one metal salt of an acrylate;
   c) at least one liquid acrylate, applied to a support, and
   d) an additive and/or a filler,
   wherein the metal salt of acrylate is present in an amount of about 20 to 120 phr, and
   wherein the liquid acrylate is present in an amount of about 10 to about 80 phr.

* * * * *